United States Patent
Bacher et al.

(10) Patent No.: US 6,728,012 B2
(45) Date of Patent: *Apr. 27, 2004

(54) MULTIFUNCTION TERMINAL

(75) Inventors: Eric Bacher, Pully (CH); Giuseppe Bortolotti, Yverdon (CH)

(73) Assignee: Olivetti Tecnost S.p.A., Ivrea (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/346,727

(22) Filed: Jul. 2, 1999

(65) Prior Publication Data

US 2003/0164993 A1 Sep. 4, 2003

(30) Foreign Application Priority Data

Jul. 3, 1998 (CH) ................................................ 1420/98

(51) Int. Cl.⁷ ................................................ H04N 1/04
(52) U.S. Cl. ........................ 358/498; 358/496; 271/160; 399/364; 399/373
(58) Field of Search ................................. 358/498, 496, 358/474, 400, 505, 487; 271/160; 399/364, 373

(56) References Cited

U.S. PATENT DOCUMENTS

| | | | | |
|---|---|---|---|---|
| 4,261,661 A | | 4/1981 | Thiers | 355/24 |
| 4,419,007 A | * | 12/1983 | Kingsley | 355/14 |
| 4,586,812 A | | 5/1986 | Kaneko et al. | 355/24 |
| 4,814,798 A | * | 3/1989 | Fukae | 346/160 |
| 5,093,690 A | | 3/1992 | Ohno et al. | 355/319 |
| 5,438,435 A | * | 8/1995 | Lawniczaka | 358/449 |
| 5,463,451 A | * | 10/1995 | Acquaviva et al. | 355/233 |
| 5,926,681 A | * | 7/1999 | Ishimaru | 399/367 |

* cited by examiner

Primary Examiner—Kimberly Williams
Assistant Examiner—Negussie Worku
(74) Attorney, Agent, or Firm—Banner & Witcoff, Ltd.

(57) ABSTRACT

A multifunction terminal is suitable for performing the functions of printing, scanning, copying, fax transmission and reception and/or sorting of documents. It comprises feeding stations (12, 14) for the sheets and the originals, a feeding path (18) with a printer (51) and a data reader (55), and a reception assembly (20) mounted pivotingly on a frame (10) and comprising reception holders (64, 65) and intermediate storing trays (62, 63). The sheets and the originals are fed by feeding members (77) into the storing trays, are retained there and displaced before being fed back into the feeding path where they are turned over for processing, printing, reading of their second face. Accordingly a multifunction terminal is obtained, which is simple to build, compact and reliable, providing a large number of duplex processing functions, all at a very moderate cost price.

5 Claims, 5 Drawing Sheets

MULTIFUNCTION TERMINAL

TEXT OF THE DESCRIPTION

1. Background of the Invention

This invention relates to a multifunction terminal comprising a frame, at least one sheet feeding station, a routing device with a sheet feeding path and at least one sheet outlet receptacle.

2. Prior Art

Terminals are known that are suitable for effecting various functions such as printing, copying, fax transmission and reception. One such terminal is, for example, that described in U.S. Pat. No. 4,814,798. These known terminals are not however suitable for a duplex type processing of the documents in all their functions. Moreover, they are complicated to build, have numerous components and are generally bulky. In their duplex printing function, the known terminals are unsuitable for use with ink jet printheads on account of the fact that the still wet ink of a sheet printed on its front side can easily come into contact with members of the printer, such as the guiding walls, during the turning of the sheet, giving rise to undesirable ink erasures and blotches.

SUMMARY OF THE INVENTION

The object of this invention is to overcome the drawbacks cited above and to create a multifunction terminal that is easy to build, has not many components and low overall dimensions, while offering multiple functions, all of which possible in duplex processing, and ensuring reliable operation without ink blotches, including when using inks with a relatively long drying time.

The terminal according to the invention is accordingly characterized by the fact that it comprises an installation for the duplex processing of sheets, capable of effecting printing, scanning, copying, faxing and/or sorting functions, the said installation comprising at least one intermediate storage device arranged so as to temporarily store at least one sheet in processing which it has received from an outlet of the feeding path, and a control member suitable for displacing the intermediate storage device so that the said sheet in processing may be fed back into at least one entrance of the feeding path, the latter being arranged in such a way that the sheet in processing effects a turning-over between its entrance and its exit, printing means and a data reader being disposed along this feeding path.

With these characteristics, a multifunction terminal is obtained that is easy to build and does not have many more components than an ordinary printer. The resulting price/performance ratio is particularly advantageous. An important number of functions can be executed easily with this terminal, which is generally not very cumbersome.

The ink still wet from printing can dry during a predetermined period of time when the sheet is superimposed in the intermediate storage device. This storage device is also used as a conveying means for presenting the sheet at the printing entrance again so that printing can be effected on its second face. This arrangement accordingly permits duplex printing to be effected reliably and simply with ink jet printheads or other types of heads with drying inks. The quality and speed of sheet processing are also very high.

To advantage, the sheets to be printed and the original sheets follow at least in part the same feeding path inside the routing device.

With characteristics such as these, a particularly compact terminal may be built, having not very many components and at a moderate cost price.

According to a preferred embodiment, the intermediate storage device comprises at least two superimposed intermediate storing trays, at least one of the trays being intended to temporarily store an original sheet in the scanner, copier, fax and/or sorter functions.

These characteristics ensure rational and reliable operation, while construction remains simple.

The terminal may advantageously comprise at least one first feeding station for the sheets to be printed and at least one second feeding station for the original sheets to be scanned, copied and/or faxed and/or for sheets to be printed of another type.

Conveniently, it will comprise at least one first outlet receptacle arranged to accommodate the printed sheets and at least one second outlet receptacle arranged to accommodate the original sheets or printed sheets of another type.

With these characteristics, the processing of blank and printed sheets and originals is rendered very reliable, while a wide variety of functions and uses of the terminal is obtained.

According to a preferred embodiment, the outlet receptacle(s) and the intermediate storing tray(s) form an integral assembly mounted movably on the frame.

These characteristics ensure a particularly simple, rational and reliable construction, and extremely reduced encumbrance generally.

Other advantages will become apparent from the characteristics set down in the relevant claims and from the description provided below detailing the invention, with the aid of drawings representing schematically and by way of example one embodiment.

LIST OF FIGURES

DESCRIPTION OF THE PREFERRED EMBODIMENT

The multifunction terminal illustrated in the figures is one embodiment of document processing machines suitable for executing printing, scanning, copying, fax transmission and reception, and/or sorting of documents in the form of sheets that may contain or receive visual, graphical information, either on one or on both sides, i.e. the front and reverse pages. The documents processed by the terminal can therefore be sheets to be printed of different types, of different sizes, having different distinguishing marks, envelopes, single-sided or double-sided originals.

Figure 1:
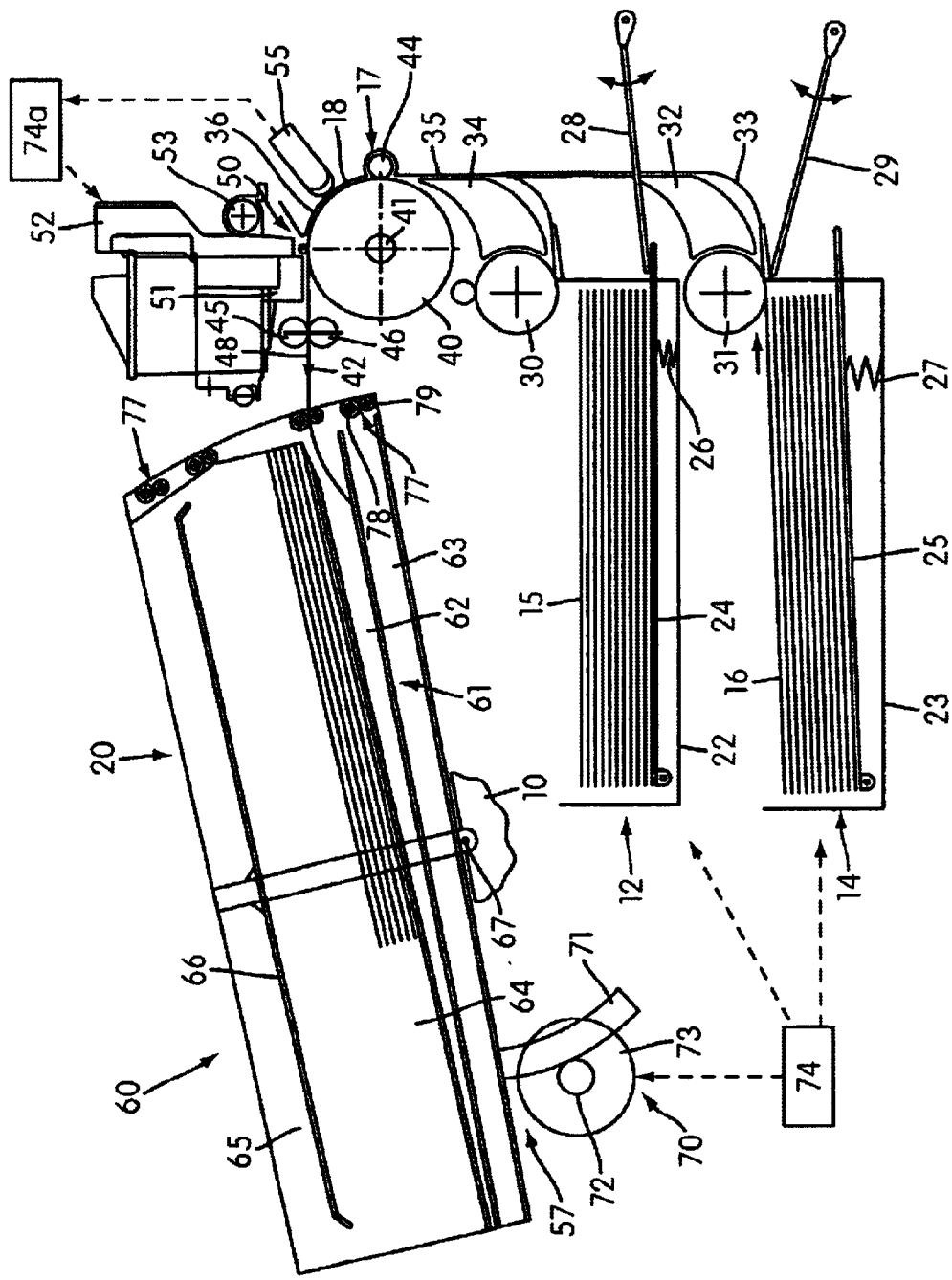
FIG. 1 is a section view of one embodiment of the terminal.

With reference to FIG. 1, the terminal comprises a frame 10, a first sheet feeding station 12, advantageously though not exclusively intended for the blank sheets 15, a second sheet feeding station 14, advantageously though not exclusively intended for the originals 16, or possibly for envelopes or blank sheets of another type, a sheet routing device 17 with a feeding path 18 and sheet reception assembly 20.

Each of the feeding stations 12, 14 possesses a holder 22,23 wherein a support plate 24,25 is mounted pivotingly, urged by a spring 26,27 against a pivoting control lever 28,29. When the latter is in the upper lever position 28, the stack of sheets is in a position removed from the selection rollers 30,31. Conversely, in the lower lever position 29, following rotation of the lever, the stack of sheets, in this case the originals 16, is urged against the selection rollers 30,31 which, by rotating in the anticlockwise direction, move the sheet forward into the feeding path 18. The latter is bounded by guiding members 32 to 36, and effects a turning-over of the sheet about a main roller 40, the axis of which is perpendicular to the sheet feeding direction 42. Auxiliary guiding and feeding rollers 44 to 46 are additionally mounted along this feeding path 18 which comprises an outlet 48.

The feeding path 18 further comprises a printing zone 50, wherein a printhead is borne by a carriage 52 mounted slidingly on at least one transversal bar 53 and arranged so as to print a sheet in processing according to a backwards and forwards movement.

The terminal also comprises a bar 55 for reading of the information contained on the originals, disposed facing the sheet passage in the feeding path 18. Here it is arranged before the printhead 51, but could also occupy any other appropriate position.

The reception assembly 20 consists of an installation 60 for the duplex processing of sheets, including originals. This installation possesses an intermediate storage device 61 comprising, in this embodiment, two intermediate storing trays 62, 63, arranged under two outlet holders or receptacles 64, 65. The lower outlet receptacle 64 is advantageously but not exclusively intended for the printed sheets or the copies and the upper outlet receptacle 65 will in this case be used to collect the originals, or sheets or envelopes of different types. This upper receptacle 65 is, in this embodiment, separated from the lower outlet receptacle 64 by a removable separation plate 66.

The two intermediate storing trays 62, 63, arranged under the outlet receptacles 64, 65, form with the latter a rigid assembly 20 mounted pivotingly on the frame 10 according to a pivoting axis 67, which is perpendicular to the sheet direction of movement 42.

A control member 70 permits the pivoting movement of this assembly 20 to be effected and comprises a rack 71 shaped as a partial arc of a circle in engagement with a pinion 72 driven by a step motor 73, under the control of a control unit 74 of the terminal.

Each storing tray 62, 63 comprises a feeding member 77 mounted at its entrance. This feeding member 77 is advantageously formed by sprocket wheels 78 integral with a transversal shaft and co-operating with counter-rotating rollers 79.

The two outlet receptacles 64, 65 are additionally provided, substantially at their entrance facing the printhead 51, with a number of superimposed feeding members 77 equal to the number of superimposed intermediate storing trays 42,43, namely two in this embodiment, each intended for one of the outlet receptacles 64, 65.

Figure 2:
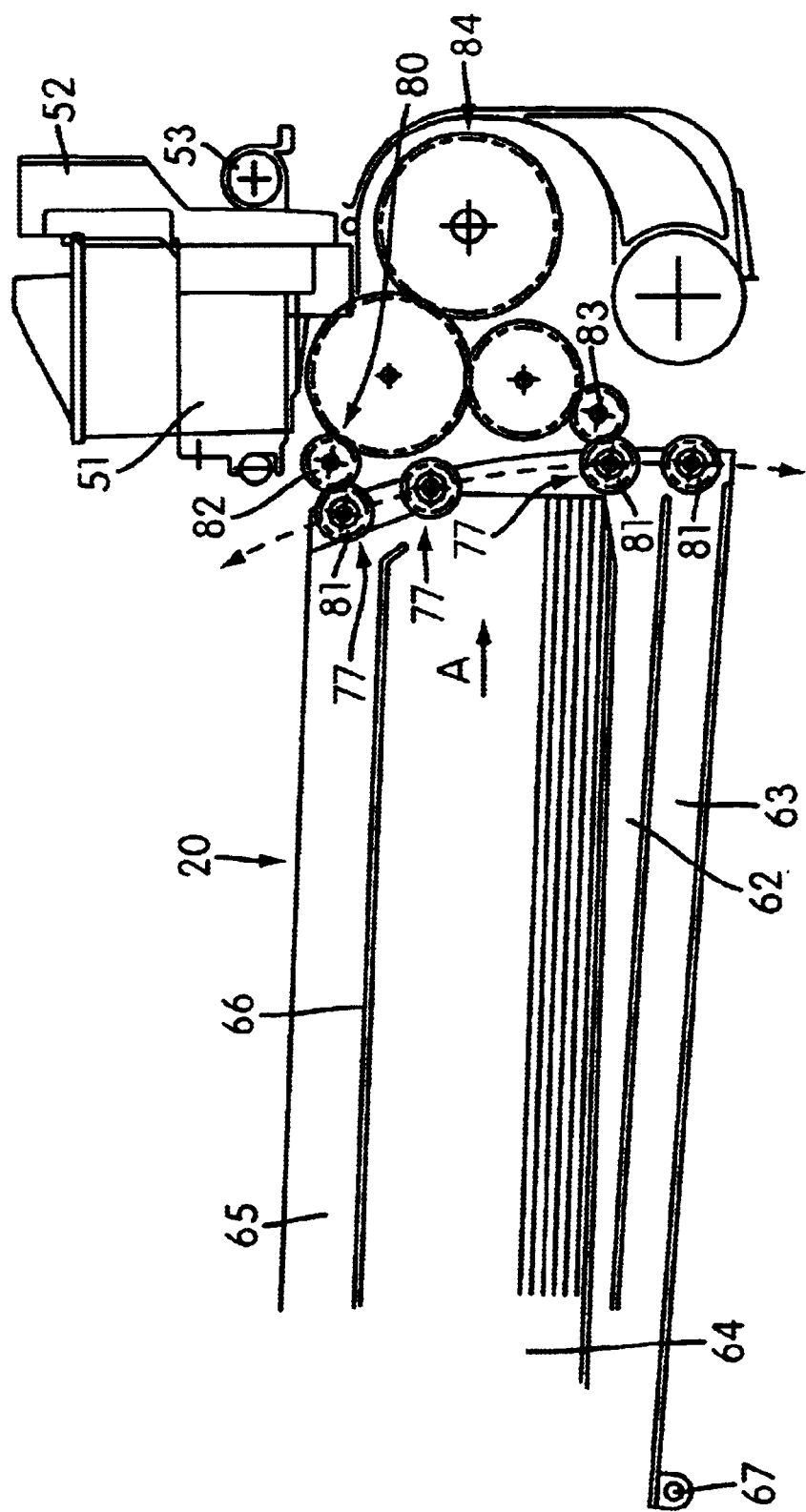
FIG. 2 is a lateral partial view of this embodiment.

These feeding members of the intermediate storing trays, and those of the outlet receptacles are arranged in identical fashion, one above the other, so that they may be put in engagement simultaneously two by two with driving members 80, mounted superimposed on the frame 10 a predetermined distance apart, as depicted in FIG. 2. The shafts of the sprocket wheels 78 are integral at their extremities with pinions 81, suitable for meshing with two driving pinions 82, 83 in engagement with a sheet feeding gear train 84. Accordingly, the reception assembly 20 may be pivoted about the axis 67 in order to activate either the sprocket wheels 78 of the lower storing tray 63 and the sprocket wheels of the lower outlet receptacle 64, or the sprocket wheels of the upper storing tray 62 and the sprocket wheels of the upper outlet receptacle 65, in accordance with control signals provided by the control unit 74.

It should be noted that the feeding members 77 of the intermediate storing trays are intended to grip and feed a processed sheet into the intermediate storing tray 62, 63, to retain it with its processed, for example printed, side facing up during the intermediate storage, thus allowing the ink to dry fully, and to feed it back through a printing entrance into the feeding path 18 for the processing, i.e. printing, of its second side. The storing trays 62, 63 are high enough for the upperside of the sheets not to touch the walls of the tray, and the ink can therefore dry without forming blotches.

The sheets to be printed 15 and the originals 16 in this terminal follow at least in part the same feeding path 18.

Operation of the terminal in copier function mode is described with reference to the FIGS. 1 and 3 to 5. The blank sheets are placed in the first feeding station 12 and will be collected after simplex or duplex printing in the first outlet receptacle 64.

The single-sided or double-sided original documents are placed in the second feeding station 14 and are collected, after processing, reading, turning-over and reading, in the second outlet receptacle 65, on the removable separation plate 66.

The graphical data read by the reader 55 are stored in a processor 74a of the terminal, then sent to the printhead 51 which makes the copies. Processing takes place in this way for single-sided or double-sided sheets.

A single-sided original document placed upside down by the user will be detected by the reader 55, which will command it to be turned over via the processor 74a.

The machine may be programmed for processing all combinations with double-sided originals, producing double-sided copies.

In FIG. 1, an original sheet is fed from the second feeding station 14, its front side is recorded by the reader 55 and it is then fed into the upper intermediate storing tray 62 where it is retained by the feeding member 77.

A blank sheet is then taken from the first feeding station 12 (FIG. 3), printed on its front side and fed into the lower intermediate storing tray 63, after the reception assembly has been tilted by a predetermined angle controlled by the control unit 74. During the intermediate storage, the sheet is retained by the feeding member 77.

Figure 4:
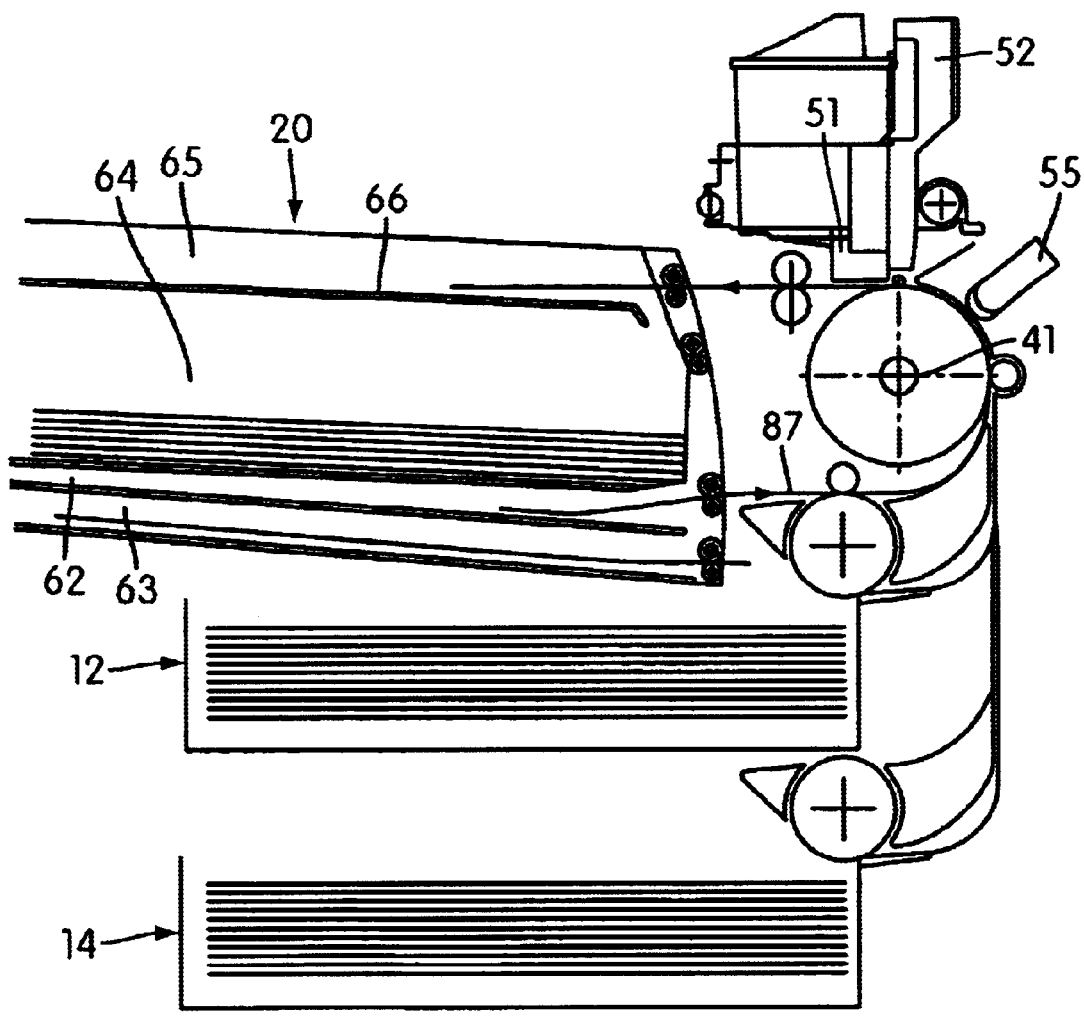

With reference to FIG. 4, the reception assembly 20 is then turned downwards so that the original sheet can be fed back through a secondary feeding entrance 87 which is different from that of the feeding stations 12 and 14. The original sheet thus undergoes a turning-over about the axis 41 and its reverse face is read and recorded as its passes in front of the reader 55. The original sheet is finally deposited in the upper reception holder 65, reverse side facing upwards.

Figure 5:
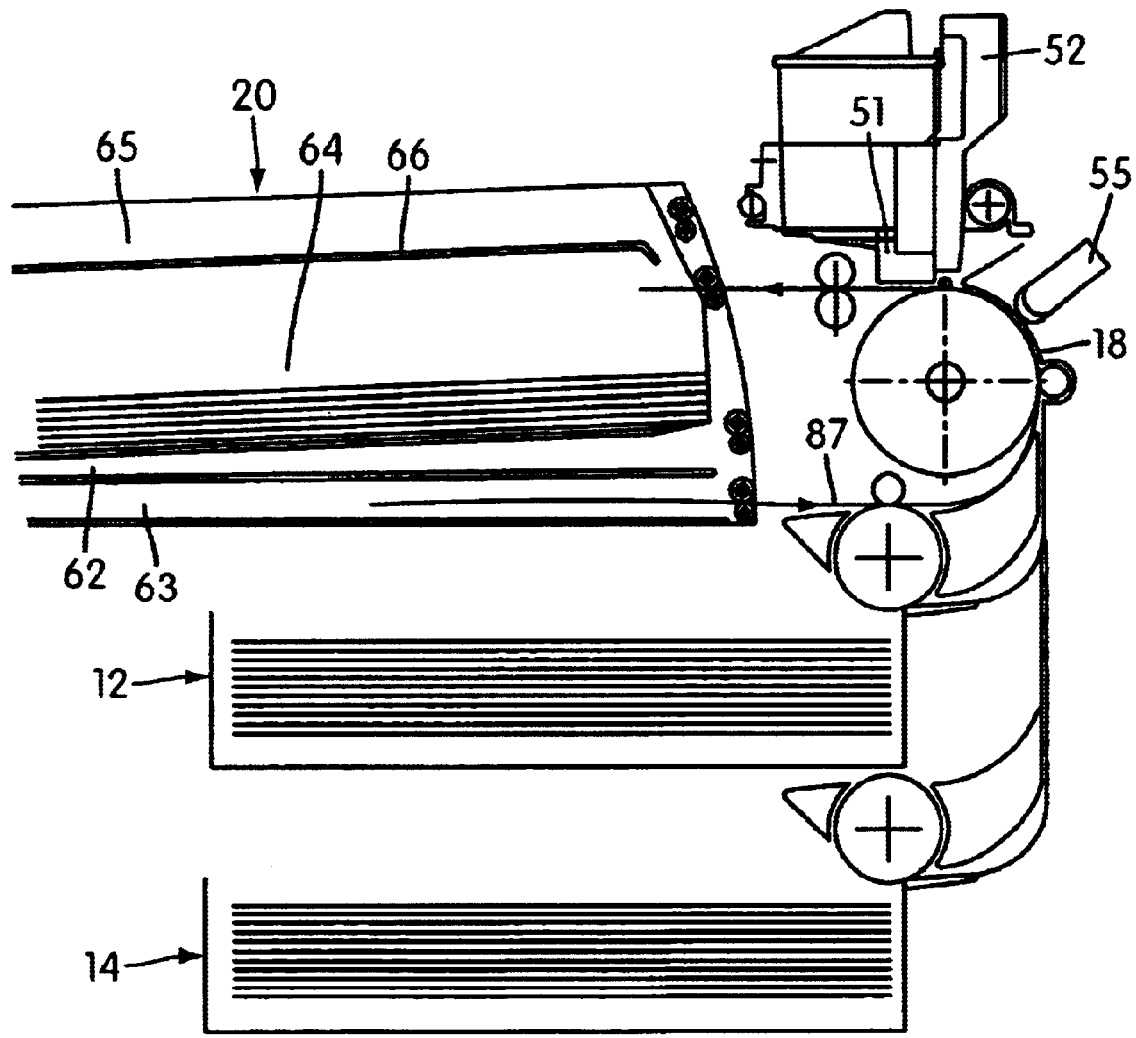

After tilting of the reception assembly 20 upwards, the sheet printed on its front side is then fed back through the secondary introduction entrance 87 (FIG. 5). It is turned over in the feeding path 18, printed on its reverse face and expelled to the lower reception holder 64, reverse side facing upwards.

The same sequence of operations will be repeated for the subsequent sheets.

Operation of the terminal in the printing function mode is fairly similar and a printing cycle is described with the aid of the same diagrams.

When a duplex printing command is given, the uppermost sheet of the stack of one of the feeding stations 12 or 14 is fed and printed on its front side. The assembly is then turned and raised so that the sheet printed on its upperside may be fed into the upper intermediate storing tray 62. It must be emphasised that the sprocket wheels of the feeding member retain this sheet while it is drying and that this sheet does not touch the walls of the tray.

Figure 3:
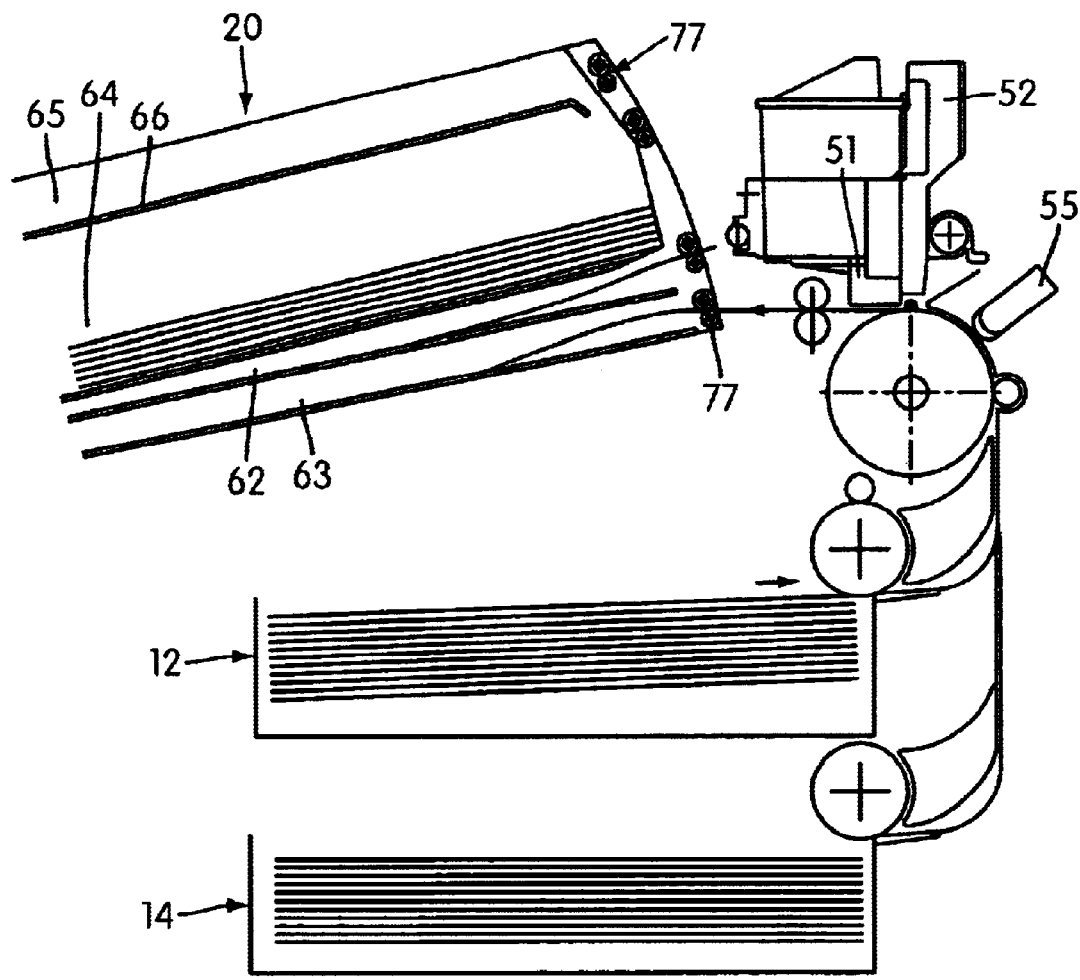
FIGS. 3 to 5 illustrate a sectional view of the terminal in different working positions.

The following sheet is then selected, printed on its front side and fed by the feeding member 77 into the lower intermediate storing tray 63, after the assembly 20 has been lifted by a predetermined angular distance (FIG. 3).

With reference to FIG. 4, this assembly 20 is then lowered so that the upper storing tray 62 is facing the secondary printing entrance 87. The first sheet, the ink of which is now dry, is extracted by the feeding member of the upper storing tray 62 and fed through the printing entrance 87 towards the printhead 51, undergoing a turning-over about the axis 41 so that the already printed side is facing downwards. The sheet can thus be printed on its reverse side, gripped by the feeding member 77 and deposited in the upper reception holder 65 or, after the removable separation plate 66 has been taken out, in the lower reception holder 64.

The assembly 20 is then tilted so that the lower storing tray 63 is facing the printing entrance 87 (FIG. 5). The sheet stored temporarily in this tray is then advanced by the feeding member 77, printed on its reverse side, gripped by the feeding member 77 and deposited in the lower reception holder 64.

A new printing cycle can now commence.

Accordingly, the intermediate storing device 61 permits a drying of the ink following printing. The printed surface does not rub against the walls of the guiding channel, as is the case in the known terminals and printers. The invention is therefore particularly suited to ink jet printers for which duplex printing installations were previously unsuitable. In order to optimise performance of the printer, some of the movements may be simultaneous, provided that the ink drying time is respected.

This terminal also comprises the following additional functions:

- the presence of two sheet feeding stations permits the alternate use of blank sheets of another format, type or logo.
- the document reader 55 permits verification of the validity of the sheet introduced or checking that the sheet has been turned over.
- the implementation of the separation plate 66 of the upper outlet receptacle 65 enables the separate collection, after printing, of alternatively different documents or signalled as such by the reader.
- In addition, by eliminating printing by the head and by feeding the sheets through the feeding path, it is possible to rearrange a stack of sheets of which the succession of pages is in the inverse order. The terminal in this function accordingly serves as a sheet sorter.

Operation of the terminal in the fax transmission mode is similar to that in copying ode for the processing of original documents without printing being effected, but with storage of the data read, and transmission of the latter via teleprocessing controlled by the processor 74a.

For the fax reception mode of operation, the blank sheets are placed in the first sheet feeding station 12, the incoming message is stored, then sent to the printing device in simplex or duplex mode, the printed sheets are collected after simplex or duplex printing in the lower reception holder 64.

This terminal therefore has the advantage of being simple to construct, offering multiple functions in addition to those of a printer, and this in duplex mode possible for all the functions, while comprising only very few members more than the latter. In addition, it permits a particularly reliable processing of the documents and assured drying of the ink, avoiding all erasures or blotches. A particularly advantageous price/performance ratio is accordingly obtained.

Naturally the embodiment described above does not have any restricting characteristics and all the modifications desired may be made thereto within the scope as defined in claim 1. In particular, the feeding stations and the reception holders could be arranged differently, for example they could be disposed at either side of the printing zone.

In a simplified variant without second feeding station, the original document may be placed on the stack of blank sheets. In this case, these originals must be processed immediately, so that the blank sheets have access to the printer.

According to other simplified variants, some of the functions, such as the fax function, may be omitted or added solely as an option.

The intermediate storing trays could be of a different number, for example one only in a simple variant or ten in a large-size terminal. They could also be separate from the reception holder 64, 65 and form a distinct temporary storage unit. Instead of a pivoting movement, the assembly 20 could also be displaced by vertical translation. The feeding members 77 could be of a type other than sprocket wheels, for instance rollers co-operating with the lateral margins of the sheets. The feeding path 18 could be disposed differently, but must nonetheless ensure the turning-over of the sheet for duplex processing. The invention is particularly well suited to use with an ink jet printhead, but may also be applied to other types of printing.

We claim:

1. A multifunction terminal comprising a frame, at least one sheet feeding station, a routing device with a sheet feeding path, printing means and a data reader and at least one sheet outlet receptacle capable of effecting a printing function on sheets to be printed and scanning, copying, faxing or sorting functions on original sheets, wherein it comprises an installation which is provided for performing the duplex processing of the sheets in connection with each of said functions, said installation comprising at least one intermediate storage device arranged so as to temporarily store at least one sheet in processing of printing or scanning with a sole face processed and which it has received from an outlet of the transport path, and a control member suitable for displacing the intermediate storage device so that said sheet in processing may be fed back into at least one entrance of the feeding path, the latter being arranged so that the sheet in processing of printing or scanning effects a turning-over between its entrance and its outlet for the processing of the other face;

wherein the sheets to be printed and the original sheets to be scanned follow at least in part the same feeding path inside the routing device; and wherein said printing means and said data reader are arranged along said same feeding path.

2. The terminal according to claim 1, wherein it further comprises at least one first feeding station for the sheets to be printed and at least one second feeding station for the original sheets to be scanned, copied or faxed, or for sheets to be printed of another type for feeding the sheets to be printed and the original sheets to said same feeding path.

3. A multifunction terminal comprising a frame, at least one sheet feeding station, a routing device with a sheet feeding path, and at least one sheet outlet receptacle capable of effecting a printing function on sheets to be printed and scanning, copying, faxing or sorting functions on original sheets, wherein it comprises an installation which is provided for performing the duplex processing of the sheets in connection with each of said functions, said installation comprising at least one intermediate storing tray arranged so as to temporarily store at least one sheet in processing of printing or one sheet in processing of scanning with a sole face processed and which it has received from an outlet of the transport path;

wherein the outlet receptacle(s) and the intermediate storing tray(s) form an integral assembly mounted movably on the frame;

wherein said assembly is displaceable by a control member for causing said one sheet in processing of printing or said one sheet in processing of scanning to be accessed in the intermediate storing tray(s) and to exit from said intermediate storing tray(s) for the processing of the other face;

said control member being provided for displacing said assembly to cause the original sheets and the printed sheets to access said outlet receptacle(s).

4. A multifunction terminal comprising a frame, at least one sheet feeding station, a routing device with a sheet feeding path and at least one sheet outlet receptacle, capable of effecting printing, scanning, copying, faxing or sorting functions, wherein it comprises an installation which is provided for performing the duplex processing of the sheets in connection with each of said functions, said installation comprising at least one intermediate storage device arranged so as to temporarily store at least one sheet in processing which it has received from an outlet of the transport path, and wherein said intermediate storage device comprises at least two superimposed intermediate storing trays, at least one of the trays being intended to temporarily store an original sheet in the scanner, copier, fax or sorter functions;

wherein each intermediate storing tray comprises substantially at its entrance a feeding member intended to grip and feed a sheet in processing into the intermediate storing tray, to retain it during the intermediate storage, and to feed it back through said entrance of the feeding path for the processing of its second face; and wherein the outlet receptacle(s) are provided, substantially at their entrance, with a number of superimposed feeding members equal to the number of superimposed intermediate storing trays, the feeding members of the intermediate storing tray(s) and those of the outlet receptacle(s) being arranged in identical fashion, one above the other, so that the corresponding feeding members of the intermediate storing tray(s) and of the outlet receptacle(s) are suitable for being put in engagement simultaneously with two driving members, mounted superimposed on the frame and separated from each other by a predetermined distance.

5. The terminal according to claim 4, wherein the feeding members are formed by sprocket wheels co-operating with counter-rotating rollers.

\* \* \* \* \*